Patented Mar. 20, 1951

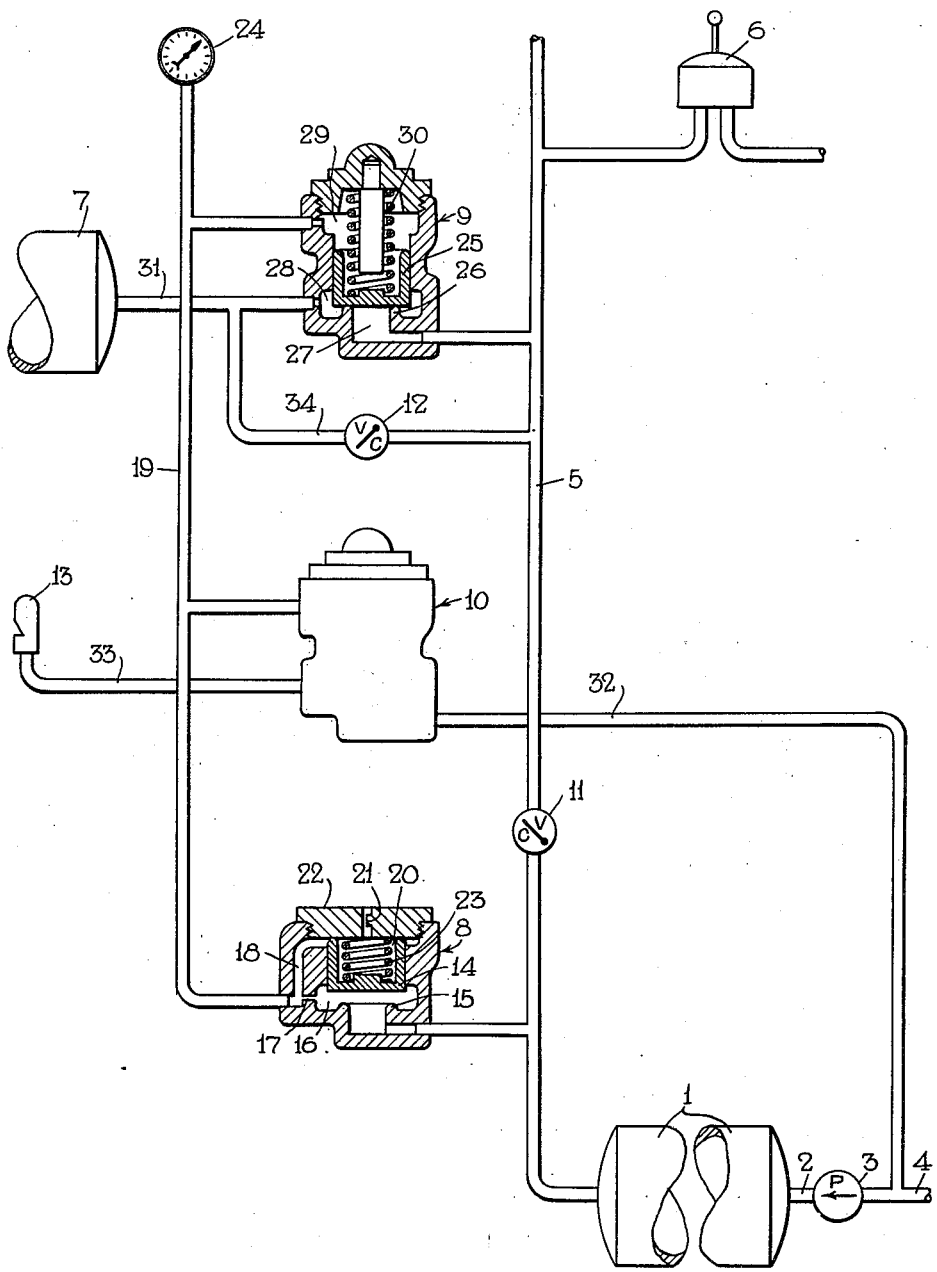

2,545,532

UNITED STATES PATENT OFFICE 2,545,532

CONTROL APPARATUS

Roy R. Stevens, Forest Hills, Pa., assignor to The Westinghouse Air Brake Company, Wilmerding, Pa., a corporation of Pennsylvania Application May 14, 1946, Serial No. 669,724

2 Claims. (Cl. 137—78)

This invention relates to control apparatus and more particularly to the fluid pressure type.

In certain hoisting equipment, the hoisting drum is actuated through the medium of a fluid pressure actuated hoisting clutch, and a fluid pressure actuated brake is employed for holding the drum against movement and for also controlling operation of said drum to lower a load. A mechanical latch arranged to cooperate with teeth on the drum may also be employed for locking the drum against movement. If for any reason the pressure of fluid for operating the brake or clutch should however become depleted to a degree lower than a certain safe pressure when the load was in an elevated position and at a time when the mechanical latch was released, the load might fall, and the principal object of the invention is the provision of improved means for ensuring that such will not occur.

According to this object I provide a reserve or safety source of fluid at the maximum degree of pressure normally employed in the system, and means for automatically rendering said safety source of fluid available for controlling the hoist clutch and/or brake before the pressure in the normal source becomes depleted to an unsafe degree. Moreover when the pressure of fluid in the normal source is at a safe degree, fluid under pressure is never used from the reserve source, thereby ensuring that the pressure of the reserve source will be adequate when required in an emergency. I further provide warning means for indicating visually the pressure condition of the fluid for controlling the hoisting drum brake and clutch; so that the operator may be constantly aware of said condition, and in addition to this visual indication, I provide an audible warning means or alarm device in the form of a whistle or the like to operate automatically in case of undue depletion of the fluid pressure supply in the normal source to positively call the operator's attention to the condition, so that, being aware of the condition, he may with safety lower the load to the ground or bring the mechanical latch into use for supporting the load.

Other objects and advantages will be apparent from the following more detailed description of the invention.

In the accompanying drawings, the single figure is a diagrammatic view, partly in section and partly in elevation, of a control apparatus embodying the invention.

Description

As shown in the drawing, the apparatus comprises a normal supply reservoir 1 adapted to be charged with fluid under pressure through a pipe 2 by operation of an air compressor or pump 3 which may be operated by steam supplied from a steam boiler (not shown) through a pipe 4. Fluid under pressure is taken from reservoir 1 through a fluid pressure supply pipe 5 to one or more operator's control valve devices 6 (only one being shown in the drawing) which may be of any desired type for establishing communications through which fluid under pressure will flow from said reservoir through said pipe to accomplish any desired operations.

According to the invention the apparatus further comprises a reserve or safety reservoir 7, an interlock valve device 8, two valve devices 9 and 10 of identical structure, two check valves 11 and 12, a visual indication device in the form of a pressure gage 24 and an audible signal device such as a steam whistle 13.

The interlock valve device 8 comprises a casing in which is slidably mounted a valve piston 14. At one side of the valve piston 14, the casing has a ring shaped seat 15 for seating engagement by the adjacent face of said valve piston for closing communication between the space within said seat, which is open to the fluid pressure supply pipe 5, and an annular cavity 16 encircling said seat and which is open through a restricted port 17 to a passage 18 in turn open to a pipe 19. At the opposite side of valve piston 14 is a chamber 20 open to atmosphere through a restricted passage 21 and also adapted to be open to passage 18 when said valve piston is seated against seat 15. The outer end of chamber 20 is closed by a cap 22 having the restricted passage 21 and against which the valve piston 14 is adapted to seat upon a certain movement away from the seat 15, for closing communication between passage 18 and atmosphere through chamber 20. A spring 23 contained in chamber 20 bears at one end against cap 22 and at the opposite end against the valve piston 14.

The valve devices 9 and 10 each comprises a casing in which is slidably mounted a valve piston 25. At one side of the valve piston 25 the casing has a ring shaped seat 26 for engagement by said valve piston to close communication between a space 27 encircled by said seat and an annular cavity 28 encircling said seat. At the opposite side of valve piston 25 is a chamber 29 containing a spring 30 acting on said valve piston for urging it into contact with seat 26.

In the valve device 9 the space 27 is connected to pipe 5, the annular cavity 28 is open to a pipe 31 leading to the safety reservoir 7, and chamber 29 is connected to pipe 19, while in the valve device 10 the corresponding space, cavity and chamber are open respectively to a pipe 32, a pipe 33 and pipe 19. Pipe 32 leads to the steam supply pipe 4, while pipe 33 leads to the steam whistle 13.

The check valve 11 is interposed in the fluid pressure supply pipe 5 between the normal supply reservoir 1 and the connection between said pipe and the valve device 9 and is so arranged as to permit flow of fluid under pressure from said reservoir but to prevent reverse flow. The check valve 12 is disposed in a pipe 34 connecting the fluid pressure supply pipe 5 to pipe 31 leading to the safety reservoir and is so arranged as to permit flow of fluid under pressure only in the direction to said reservoir.

*Operation*

In operation, assume initially that the whole apparatus is at atmospheric pressure, under which condition the valve piston 14 in the interlock valve device 8 will be seated on seat rib 15 closing communication between pipes 5 and 19 and opening the latter pipe to atmosphere through chamber 20 and passage 21. The valve piston 25 will also be seated by spring 30 against seat rib 26 in both of the valve devices 9 and 10 for closing communication between pipes 5 and 31 through the valve device 9, and between pipes 32 and 33 through the valve device 10.

If now steam under pressure is supplied through pipe 4 to the air compressor 3 said compressor will operate to compress air into the normal supply reservoir 1 from whence it will flow through pipe 5 past the check valve 11 therein, to the operator's control device 6 and be available for use.

Fluid under pressure supplied to pipe 5 will also flow through pipe 34 past the check valve 12 therein into the reserve or safety reservoir 7 wherein the pressure will increase substantially in unison with and to substantially the same degree as obtained in the normal supply reservoir 1.

With valve piston 14 in the interlock valve device 8 initially seated against the seat ring 15 opening pipe 19 and chamber 29 in the valve devices 9 and 10 to atmosphere, the valve piston 25 in the valve device 9 will be moved out of contact with its seat ring 26 when the pressure of fluid in pipe 5 acting within said seat ring becomes increased to a degree sufficient to overcome the opposing force of spring 30. Fluid under pressure will then flow from pipe 5 to the safety reservoir 7 along with the flow to said reservoir by way of the check valve 12. With chamber 29 in the valve device 10 open to atmosphere as just mentioned, the pressure of steam effective through pipe 32 on the valve piston 25 will move said valve piston away from its seat ring 26, so that steam will be supplied to pipe 33 and thence to whistle 13 and cause sounding thereof.

The valve piston 14 in the interlock valve device being initially seated against seat ring 15, as above mentioned, the area of said valve piston within said ring is also subject to pressure of fluid in pipe 5, and when such pressure becomes increased to a sufficient degree, it will move said valve piston against spring 23 and out of contact with seat ring 15. Fluid under pressure will then flow past the seat ring 15 to chamber 16, and due to the restricting effect of choke 17 to permit dissipation of fluid under pressure from chamber 16 at this time, the valve piston 14 will become subject over its full lower face to substantially the same pressure as effective in pipe 5 and this will produce a force on the one side of said valve piston so in excess of the opposing force of spring 23 as to snap said valve piston into seating engagement with cover 22 for closing communication between passage 18 and the atmospheric passage 21 while maintaining open the communication between pipes 5 and 19 to permit equalization of pressure of fluid from pipe 5 into pipe 19 and thence into chamber 29 in the valve devices 9 and 10. In the valve device 9, this pressure of fluid provided in chamber 29 and coacting with the respective spring 30 will seat valve piston 25 against seat ring 26 to close the communication through said valve device between the safety reservoir 7 and pipe 5, while in the valve device 10, the pressure of fluid provided in chamber 29 and acting with spring 30 will seat the valve piston 25 against its seat 26 to cut off flow of steam to whistle 13 to stop blowing thereof. This condition of the valve devices 9 and 10 will then be maintained until pipe 19 is subsequently opened to atmosphere, as will be later described.

After the interlock valve device 8 operates to establish communication between pipes 5 and 19, and the valve devices 9 and 10 are operated by the fluid under pressure supplied to pipe 19 as just described, the pressure of fluid in pipe 5 will be further increased by operation of pump 3, to a preselected maximum degree; and the pressure of fluid in the safety reservoir 7 will correspondingly increase by flow past the check valve 12 in pipe 34, so that the pressure of fluid obtained in said safety reservoir will become equal substantially to the maximum ever provided in the normal supply reservoir 1.

If fluid under pressure is now used from the supply pipe 5 by operation of the operator's control device 6, the pressure of fluid in said pipe will tend to reduce, but normally will be maintained or restored by flow of fluid under pressure from the normal supply reservoir 1 and pump 3, it being noted that restoration cannot occur from the safety reservoir 7 since communication between said safety reservoir 1 and pipe 5 is closed by the valve device 9 and check valve 12.

The use of fluid under pressure from pipe 5 and the normal supply reservoir 1 by operation of the operator's control device 6 will normally never reduce the pressure of such fluid to below a minimum safe pressure, since the pump 3 will maintain said safe pressure. As applied to a hoist such as above mentioned, the safe pressure would for instance be the minimum required to ensure safe stopping of the drum by the brake.

However, if due to excessive use of fluid under pressure from pipe 5 and reservoir 1, or due to failure of pump 3 or deveolpment of a sufficient leak of fluid under pressure from the apparatus between said pump and the check valve 11, the pressure in pipe 5 at the interlock valve device 8 should become reduced to the minimum safe pressure above mentioned, spring 23 acting on valve piston 14 will start to move said valve piston away from cover 22. The instant the valve piston 14 is disengaged from cover 22, fluid under pressure will start to flow from passage 18 into chamber 20 and, due to port 21 being restricted, a fluid pressure will start to develop in chamber 20 to aid spring 23 to urge said valve piston toward the seat ring 15. As the movement of the valve piston 14 increases, the supply of fluid to chamber 20 and the pressure of fluid therein will increase until a sufficient pressure of fluid is obtained in said chamber to cause said valve piston to snap downwardly against the seat ring 15.

When the valve piston 14 is thus moved into contact with seat ring 15 it will cut off further flow of fluid under pressure from pipe 5 to pipe 19, and the fluid under pressure in pipe 19 and from chamber 29 in the valve devices 9 and 10 will be vented to atmosphere through chamber 20 and port 21.

This venting of fluid under pressure from chamber 29 in the valve device 10 will permit steam pressure from pipe 32 to move the valve piston 25 therein away from its seat ring 26, whereupon steam will flow to whistle 13 and actuate same to call the operator's attention to the probable failure of the normal supply of fluid under pressure from reservoir 1.

Upon the venting of fluid under pressure from chamber 29 in the valve device 9, the pressure of fluid acting on the opposite face of the valve piston 25 therein will move said valve piston out of contact with its seat 26 and connect the safety reservoir 7 to the supply pipe 5 the check valve 11 being effective at this time to prevent the pressure of fluid in said reservoir being dissipated or even reduced by flow to the normal reservoir 1. The safety reservoir 7 being charged at the maximum pressure ever obtained in the apparatus, this pressure therefore becomes effective at the operator's control device 6 whereby the operator may then with adequate safety complete a necessary operation or the like, or in other words prevent an accident which might otherwise occur.

The pressure gage 24 provides a constant visual indication of the pressure of fluid in pipe 5 and the normal reservoir 1 when the interlock valve device 8 is in the position in which it is shown in the drawing, so that in case of a partial failure of the supply of fluid under pressure in reservoir 1, impending possibly a greater degree of failure, the operator may act to remedy the cause before waiting for the degree of failure to increase sufficiently for opening the safety reservoir 7 to pipe 5. If the degree of failure does increase to the degree required to connect the safety reservoir to pipe 5, the quick change in adjustment of the pressure gage 24 incident to opening pipe 19 to atmosphere will give a visual indication, along with the audible indication given by whistle 13 of the emergency or dangerous situation, so as to ensure prompt safety action on the part of the operator.

Having now described my invention, what I claim as new and desire to secure by Letters Patent, is:

1. In a control apparatus, a normal fluid pressure supply reservoir, a fluid pressure supply pipe for receiving fluid under pressure from said reservoir, a check valve in said pipe for preventing flow of fluid under pressure from said pipe to said reservoir, a safety reservoir, pipe means connecting said reservoirs for conveying fluid under pressure from said normal reservoir to said safety reservoir, a check valve in said pipe means for preventing reverse flow of fluid under pressure therethrough, fluid conveying means connecting said safety reservoir to said supply pipe at the outlet side of the first named check valve for conveying fluid under pressure from said safety reservoir to said supply pipe, said fluid conveying means comprising a valve operable by fluid under pressure to close communication through said fluid conveying means and operable upon release of fluid under pressure to open said communication, a valve device subject to and operable upon an increase in pressure in said supply pipe to above a chosen pressure to supply operating fluid under pressure to said valve and operable upon a reduction in pressure in said supply pipe to below said chosen pressure to release operating fluid under pressure from said valve, an operator's warning device, another valve operable upon release of operating fluid pressure to effect operation of said warning device and operable by operating fluid pressure to prevent operation of said warning device, said valve device controlling the supply and release of operating fluid under pressure to and from said other valve in parallel with the supply and release to and from the first named valve.

2. In a control apparatus, a normal fluid pressure supply reservoir, a first fluid pressure supply pipe, compressor means operable by fluid under pressure from said pipe to compress fluid into said normal reservoir, a second fluid pressure supply pipe for receiving fluid under pressure from said reservoir, a check valve in said second pipe for preventing flow of fluid under pressure from said second pipe to said reservoir, a safety reservoir, pipe means connecting said reservoirs for conveying fluid under pressure from said normal reservoir to said safety reservoir, a check valve in said pipe means for preventing reverse flow of fluid under pressure therethrough, fluid conveying means connecting said safety reservoir to said second supply pipe at the outlet side of the first named check valve for conveying fluid under pressure from said safety reservoir to said second supply pipe, said fluid conveying means comprising a valve operable by fluid under pressure to close communication through said fluid conveying means and operable upon release of fluid under pressure to open said communication, a valve device subject to and operable upon an increase in pressure in said second supply pipe to above a chosen pressure to supply operating fluid under pressure to said valve and operable upon a reduction in pressure in said second supply pipe to below said chosen pressure to release operating fluid under pressure from said valve, an operator's fluid pressure actuated warning device, another valve operable upon release of operating fluid under pressure to supply fluid under pressure from said first supply pipe to said warning device to effect operation thereof and operable by operating fluid under pressure to prevent supply of fluid under pressure from said first supply pipe to said warning device, said valve device being operable to supply operating fluid under pressure to and release operating fluid under pressure from said other valve in coincidence with supply and release of operating fluid under pressure to and from the first named valve.

ROY R. STEVENS.

REFERENCES CITED

The following references are of record in the file of this patent:

UNITED STATES PATENTS

| Number | Name | Date |
|---|---|---|
| 334,080 | Mason | Jan. 12, 1886 |
| 1,117,041 | Hanlon | Nov. 10, 1914 |
| 1,469,585 | McCune | Oct. 2, 1923 |
| 2,396,984 | Broadston et al. | Mar. 19, 1946 |